US010807733B2

(12) United States Patent
Leachman et al.

(10) Patent No.: US 10,807,733 B2
(45) Date of Patent: Oct. 20, 2020

(54) PUNCTURE-RESISTANT STORAGE SYSTEMS AND DEVICES

(71) Applicant: Bell Helicopter Textron Inc., Fort Worth, TX (US)

(72) Inventors: Joseph Daniel Leachman, Keller, TX (US); Danielle Vann, Hurst, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 29 days.

(21) Appl. No.: 15/939,849

(22) Filed: Mar. 29, 2018

(65) Prior Publication Data
US 2019/0300194 A1 Oct. 3, 2019

(51) Int. Cl.
*B64D 37/06* (2006.01)
*H01M 2/02* (2006.01)
*B64D 37/32* (2006.01)
*H01M 2/10* (2006.01)
*H01M 10/05* (2010.01)
(Continued)

(52) U.S. Cl.
CPC ............ *B64D 37/06* (2013.01); *B64D 37/32* (2013.01); *H01M 2/0262* (2013.01); *H01M 2/0287* (2013.01); *H01M 2/1094* (2013.01); *H01M 10/0525* (2013.01); *B65D 25/18* (2013.01)

(58) Field of Classification Search
CPC .. B64D 37/06; B64D 37/32; B60K 15/03006; B60K 15/03117; B60K 15/03; B65D 1/40; B65D 25/18; B65D 25/16; B65D 25/14
USPC ............ 220/560.01, 562, 23.91, 737, 62.19, 220/62.22, 62.11; 428/36.1, 32; 244/172.3, 135 R
See application file for complete search history.

(56) References Cited

U.S. PATENT DOCUMENTS 1,669,266 A * 5/1928 Stevens .................... A45C 5/02
                                                     220/62.11
2,401,627 A * 6/1946 Eger .................... B29D 22/003
                                                     220/560.02
(Continued)

FOREIGN PATENT DOCUMENTS

EP       0769671 A2    4/1997
EP       0769671 A3    1/1998
GB        567888 A  *  3/1945  ............. B64D 37/06

OTHER PUBLICATIONS

EPO Search Report issue in EP Patent Application No. 18177694.9 dated Dec. 17, 2018, 5 pages.
(Continued)

*Primary Examiner* — Robert J Hicks
(74) *Attorney, Agent, or Firm* — Patent Capital Group

(57) ABSTRACT

A storage system is provided in one example embodiment and may include a storage device that may include a plurality of outer walls; and a liner that covers one or more of the outer walls, wherein the liner comprises a woven material that is puncture-resistant. A storage device is provided in another example embodiment and may include a plurality of outer walls, wherein at least one of the outer walls comprises a woven material that is puncture-resistant. A vehicle is provided in another example embodiment and may include a fuel system that includes a fuel cell. The fuel cell may include a plurality of outer walls, and at least one of: a puncture-resistant liner covers one or more of the outer walls; and one or more of the outer walls comprises a woven material that is puncture resistant.

14 Claims, 10 Drawing Sheets

(51) Int. Cl.
*H01M 10/0525* (2010.01)
*B65D 25/18* (2006.01)

(56) References Cited

U.S. PATENT DOCUMENTS

| | | | | | |
|---|---|---|---|---|---|
| 2,439,366 | A | * | 4/1948 | Mclaughlin | B64D 37/06 |
| | | | | | 220/560.02 |
| 2,439,562 | A | * | 4/1948 | Cunningham | B64D 37/06 |
| | | | | | 220/4.14 |
| 2,451,911 | A | * | 10/1948 | Braden | B64D 37/06 |
| | | | | | 220/4.14 |
| 2,601,525 | A | * | 6/1952 | Howald | B64D 37/06 |
| | | | | | 220/560.02 |
| 3,229,248 | A | * | 1/1966 | Harris | G01V 1/104 |
| | | | | | 181/113 |
| 3,519,529 | A | * | 7/1970 | Cook | B60K 15/03177 |
| | | | | | 428/142 |
| 3,537,415 | A | * | 11/1970 | Jackson | F17C 3/04 |
| | | | | | 114/74 A |
| 3,567,536 | A | * | 3/1971 | Wickersham, Jr. | B32B 27/00 |
| | | | | | 156/78 |
| 4,016,997 | A | * | 4/1977 | Roffler | B65D 25/16 |
| | | | | | 220/62.11 |
| 4,453,995 | A | * | 6/1984 | Morrisey | B29C 53/602 |
| | | | | | 156/172 |
| 7,909,288 | B2 | * | 3/2011 | Anghileri | B64C 1/062 |
| | | | | | 244/129.2 |
| 9,597,848 | B1 | * | 3/2017 | Whipple | B29D 22/003 |
| 2011/0079456 | A1 | | 4/2011 | Borumand et al. | |
| 2015/0231966 | A1 | | 8/2015 | Bemis et al. | |
| 2015/0274311 | A1 | | 10/2015 | Briand | |

OTHER PUBLICATIONS

Federal Aviation Administration, "A Study of Helicopter Crash-Resistant Fuel Systems," Final Report DOT/FAA/AR-01/76, Feb. 2002, 170 pages.
Neptunic, "Sharksuits," retrieved and printed from https://neptunic.com/products/sharksuits on Mar. 18, 2018 1:45:37 PM, 7 pages.
Perrella, Jr., "Tests of Crash-Resistant Fuel System for General Aviation Aircraft," Report No. FAA-RD-78-28, Mar. 1978, 33 pages.
EPO Examination Report issue in EP Patent Application No. 18177694.9 dated Jan. 14, 2019, 7 pages.
N.N.: "3M(TM) Nextel(TM) Flame Shield AL-1," Sep. 1, 2002 (Sep. 1, 2002), XP055527726, retrieved from the Internet Nov. 28, 2018, 2 pages; http://multimedia.3m.com/mws/media/350787O/3m-nextel-flame-shield-product-bulletin.pdf.
EPO Examination Report for EP Application No. 18177694.9 dated Jun. 27, 2019, 5 pages.
EPO Examination Report for EP Application No. 18177694.9 dated Sep. 20, 2019, 4 pages.
EPO Examination Report for EP Application No. 18177694.9 dated Jan. 8, 2020, 5 pages.

* cited by examiner

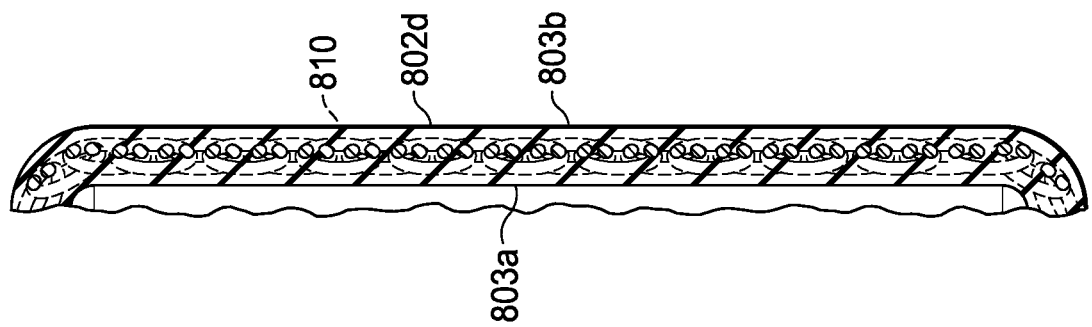
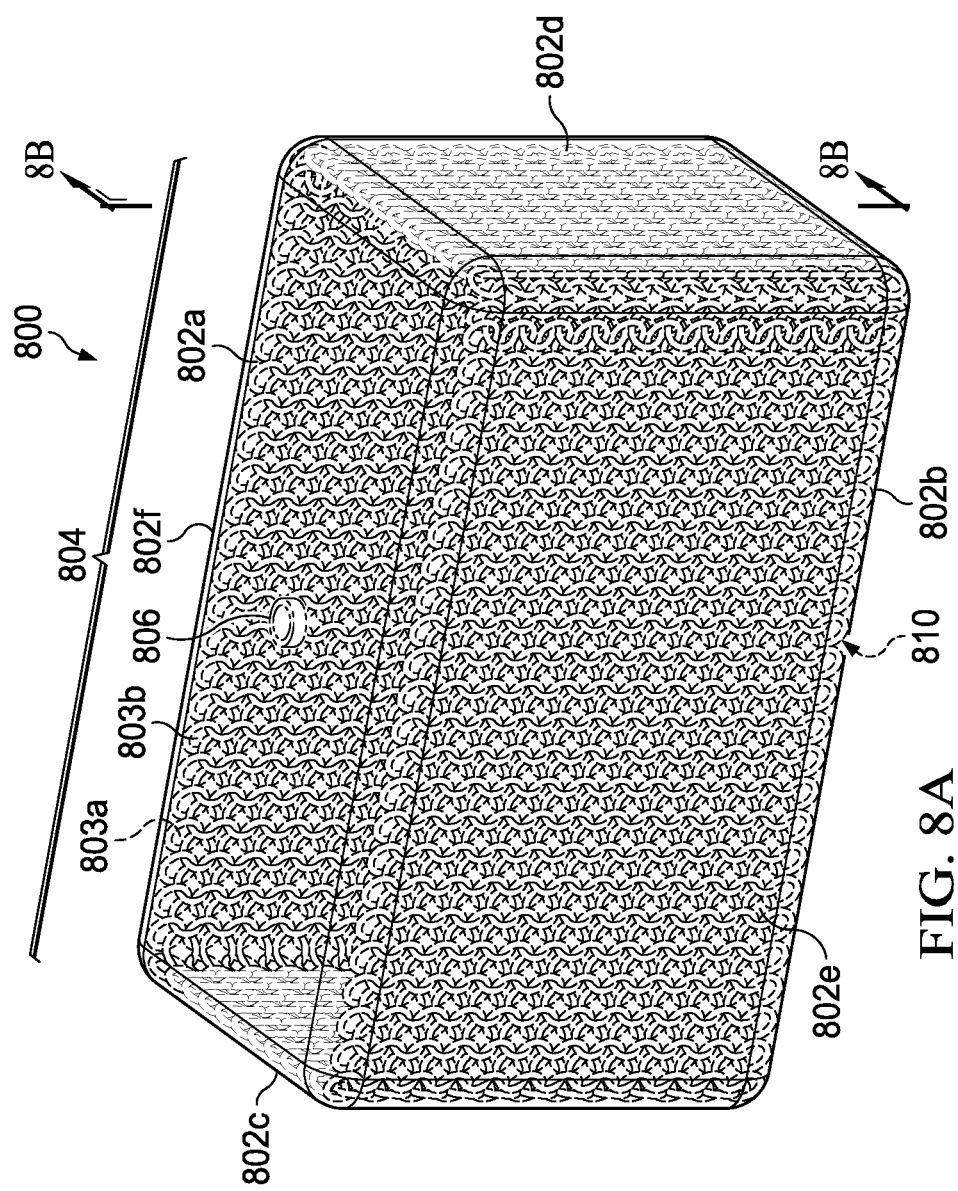
FIG. 8B
FIG. 8A

PUNCTURE-RESISTANT STORAGE SYSTEMS AND DEVICES

TECHNICAL FIELD

This disclosure relates in general to the field of aircraft and, more particularly, though not exclusively, to puncture-resistant storage systems and devices.

BACKGROUND

Storage systems including storage devices such as cells, tanks, containers, vessels, or the like can be used in fuel systems for vehicles (e.g., aircraft, boats, etc.), for transporting liquids or gasses (e.g., tanker trucks, rail cars, etc.), for storing liquids or gasses (e.g., propane tanks, oxyacetylene tanks, etc.), and many other uses. Some storage systems need to be designed to withstand different types of damage that may be sustained during a catastrophic event (e.g., a crash or collision). The design of storage systems that can withstand different types of damage, in particular, puncture type damage, during a catastrophic event can be a challenging aspect of storage system design.

SUMMARY

According to one aspect of the present disclosure, a storage system may be provided and may include a storage device, the storage device comprising a plurality of outer walls coupled together to form an enclosed volume; and a liner that covers one or more of the outer walls of the storage device, wherein the liner comprises a woven material that is puncture-resistant. The woven material can include at least one of a metallic material; and a non-metallic material. In some cases, the liner can further include a material that is flexible and is impervious to fluids or gasses passing through the material and wherein one of: the material covers at least one surface of the liner; and the liner is impregnated with the material. In some cases, the material can comprise a fuel resistant polymer.

In some cases, the liner can cover inner surfaces of one or more outer walls of the storage device. In still some cases, the liner can cover outer surfaces of one or more outer walls of the storage device. In still some cases, the liner can be attached to one or more outer walls of the storage device using a plurality of fasteners. In some cases, the plurality of fasteners can be integrated into the liner.

In some cases, wherein the storage system can be a fuel system of a rotorcraft, and the liner can be electrically bonded to a conductive frame of the rotorcraft. In some cases, the storage device can be a fuel cell of the fuel system and the fuel cell is one of a plurality of fuel cells of the fuel system having the liner that covers one or more outer walls of the plurality of fuel cells.

According to another aspect of the present disclosure, a storage device may be provided and may include a plurality of outer walls coupled together to form an enclosed volume, wherein at least one of the plurality of outer walls comprises a woven material that is puncture-resistant; and at least one port through which liquid enters or exits the storage device. In some cases, all of the plurality of outer walls can be comprised of the woven material. The woven material may comprise at least one of: a metallic material; and a non-metallic material. In some cases, the plurality of outer walls can further comprise a material that is flexible and covers the woven material. In some cases, the material that covers the woven material may comprise a polymer. In some cases, the storage device can be included in a rotorcraft and the storage device may be electrically bonded to a conductive frame of the rotorcraft.

According to another aspect of the present disclosure a vehicle may be provided and may include a fuel system, wherein the fuel system includes: a fuel cell, the fuel cell including a plurality of outer walls coupled together to form an enclosed volume, and at least one of: a liner that covers one or more of the outer walls of the fuel cell, wherein the liner comprises a woven material that is puncture-resistant; and one or more of the outer walls of the fuel cell comprises a woven material that is puncture resistant. The woven material may comprise at least one of a metallic material; and a non-metallic material. In some cases, the woven material may comprise at least one of at least two materials interlaced together; and a plurality of links coupled together. In still some cases, the liner may further comprise a material that is flexible and is impervious to fluids or gasses passing through the material and wherein one of: the material that is flexible covers at least one surface of the liner; and the liner is impregnated with the material that is flexible.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIG. 8A is a simplified isometric view diagram illustrating example details associated with an example storage device that may include puncture-resistant materials within one or more outer wall(s) of the storage device, in accordance with certain embodiments.

FIG. 8B is a simplified side, cross-sectional view of a portion of an outer wall of the example storage device of FIG. 8A, in accordance with certain embodiments.

DETAILED DESCRIPTION

Figure 1A:
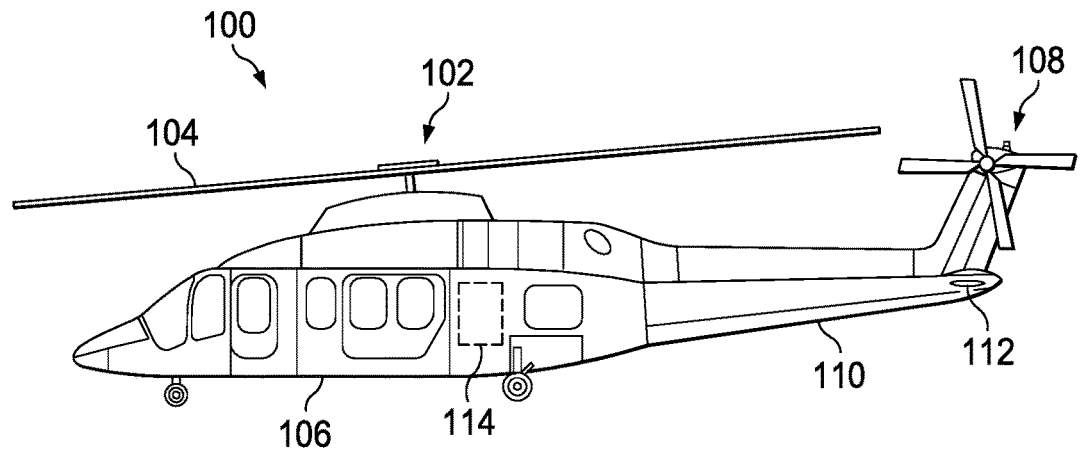
FIGS. 1A-1B and 2 are simplified diagrams of example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
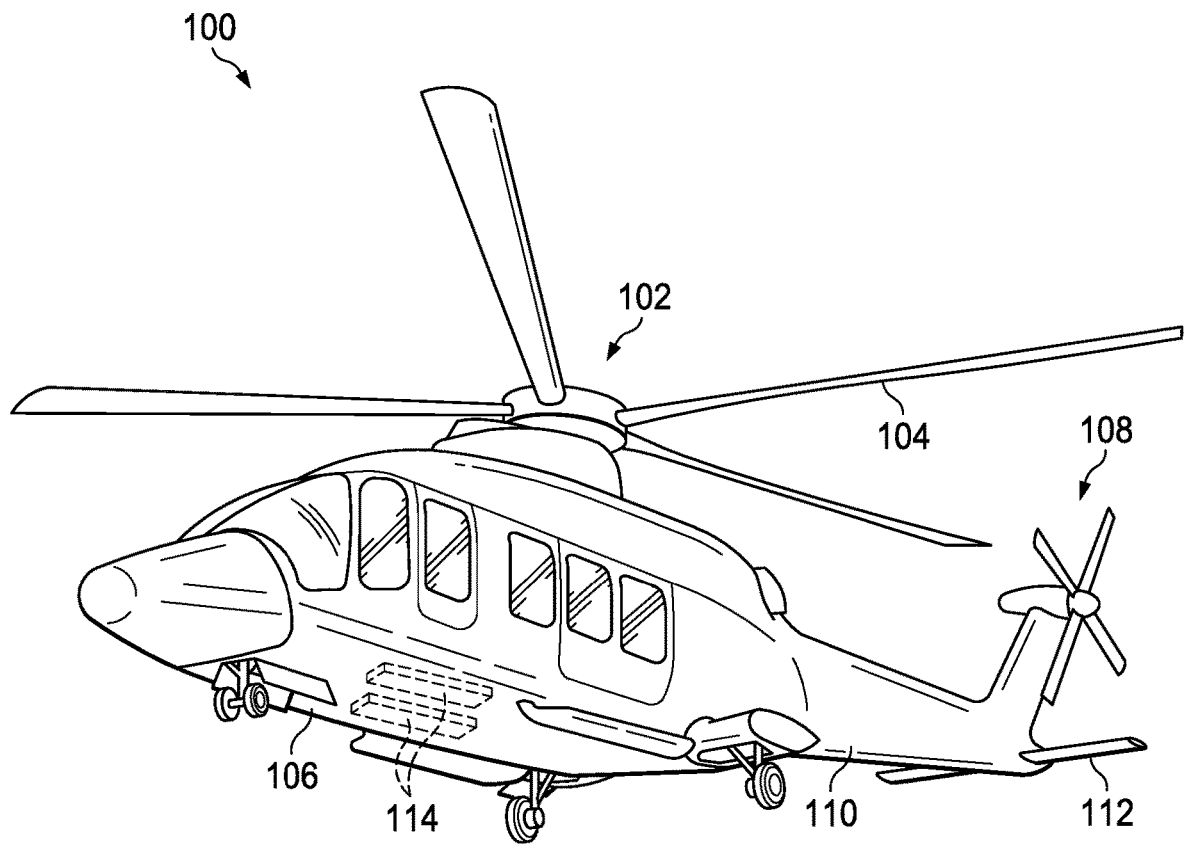

Referring to FIGS. 1A-1B, FIGS. 1A-1B illustrate an example embodiment of an aircraft, which in this example is a rotorcraft 100. FIG. 1A portrays a side view of rotorcraft 100, while FIG. 1B portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail rotor or anti-torque system 108, an empennage 110, and a tail structure 112. The fuselage 106 is the main body of the rotorcraft 100, which may include a cabin (e.g., for crew, passengers, and/or cargo) and/or may house certain mechanical components, electrical components, and/or fuel system components (e.g., engine(s), transmission, flight controls and/or fuel cells). In the illustrated embodiment, tail structure 112 may be used as a horizontal stabilizer. Torque is supplied to rotor system 102 and anti-torque system 108 using at least one engine and at least one gearbox. Rotorcraft 100 can include a fuel system that includes one or more fuel cell(s) 114. In some embodiments, the fuel cell(s) 114 can be housed at various locations within the fuselage 106.

Figure 2:
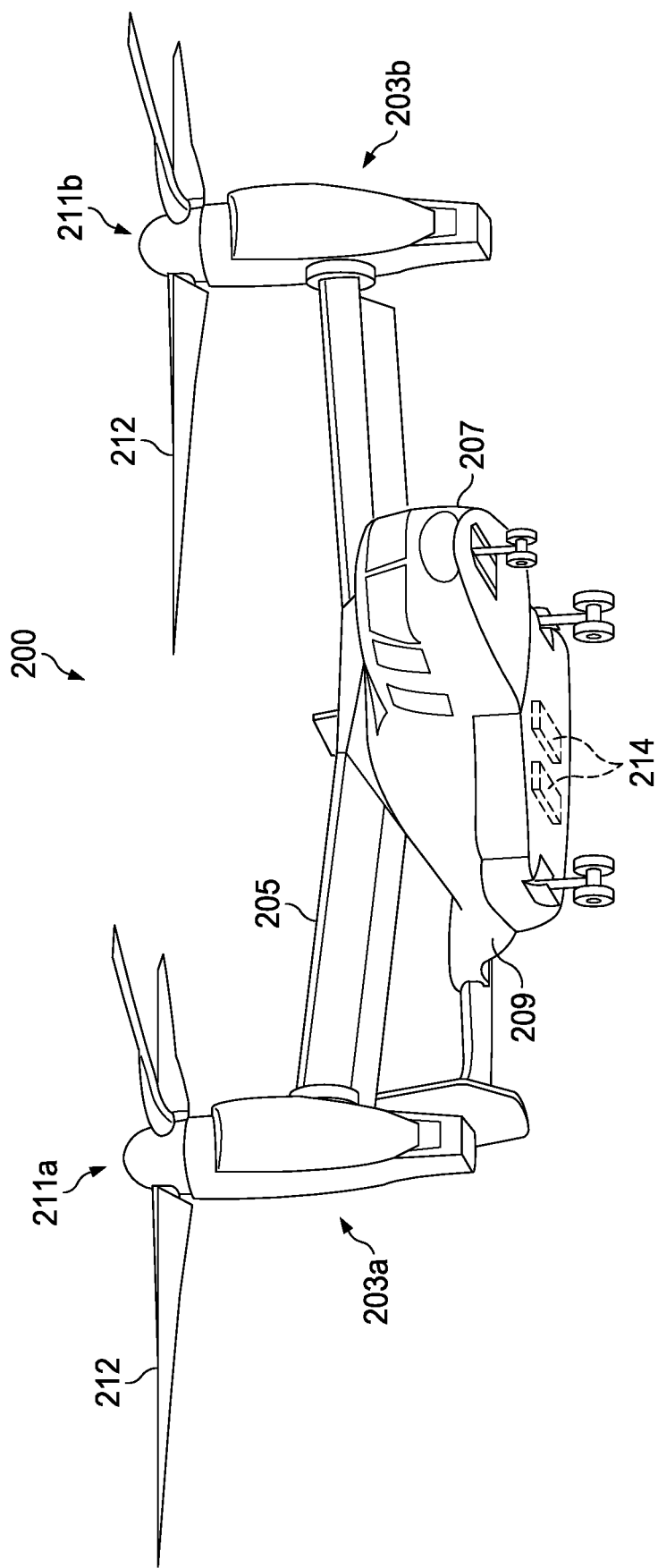

Referring to FIG. 2, FIG. 2 illustrates a perspective view of an example aircraft, which in this example is a tiltrotor aircraft 200. Tiltrotor aircraft 200 includes nacelles 203a and 203b, a wing 205, a fuselage 207, and a tail member 209. Nacelles 203a and 203b respectively include rotor systems 211a and 211b, and each rotor system includes a plurality of rotor blades 212. Moreover, each nacelle 203a and 203b may include an engine and gearbox for driving each rotor system, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, the tail member 209 may be used as a vertical stabilizer. Tiltrotor aircraft 200 can further include a fuel system that includes one or more fuel cell(s) 214. In some embodiments, the fuel cell(s) 214 can be housed at various locations within the fuselage 207.

Transport vehicles such as aircraft (e.g., rotorcraft 100, tiltrotor aircraft 200, etc.) include fuel systems that typically utilize a flammable fluid (e.g., fuel) for combustion that provides for operation of the vehicles. Some aircraft are designed with a crash-resistant fuel system (CRFS). The Federal Aviation Association (FAA) provides regulations for testing and certifying crash-resistant fuel systems for aircraft. CRFS certification typically involves a 'drop test' in which a fuel cell filled to a certain capacity (e.g., 80% capacity, 100% capacity, etc.) with water is dropped from a certain height. The height may be based on takeoff and landing approach distances (e.g., a 50 foot height). CRFS certification provides that a fuel cell should survive a drop test with no leaks following the drop test.

Some aircraft, such as legacy aircraft, do not have a certified crash-resistant fuel system when external cargo hooks are installed on the bottom side of the fuselage. This is because the cargo hooks (and their associated structures) could penetrate the fuel cells upon impact during a catastrophic event (e.g., crash and/or collision scenarios). While some materials such as non-rigid plastics, semi-rigid plastics, Kevlar®, etc. provide protection from blunt force impacts, they do not protect against sharp object punctures that may occur during a crash scenario (e.g., from a cargo hook, from airframe structure(s), from environmental element(s), etc.). Occupant safety is a priority during all phases of flight, including post-crash scenarios in which fuel leaking from a damaged fuel cell may ignite and jeopardize occupant safety. Accordingly, providing puncture resistance for fuel cells can be a challenging aspect of fuel system design.

The present disclosure describes various embodiments for providing a puncture-resistant storage system; in particular, for providing a certifiable crash-resistant fuel system for aircraft that may withstand puncture type damage (and blunt force type damage) that may occur during a catastrophic event, such as a crash and/or collision. In at least one embodiment, a puncture-resistant liner that can withstand forces applied by pointed objects of various sharpness and serration can be provided and may be positioned proximate to (e.g., near, on, attached to, covering, etc.) one or more walls of fuel cell(s) of a fuel system to protect the fuel cell(s) from puncture type damage. In one example, such a puncture-resistant liner could be used in legacy aircraft to enable CRFS certification of the aircraft without replacing the fuel cells of the aircraft. As referred to herein in this Specification, the terms 'liner' and 'blanket' may be used interchangeably.

In at least one embodiment, a fuel cell may be formed to include puncture-resistant materials within one or more wall(s) of the fuel cell, which may protect the fuel cell from puncture type damage. In one example, such pre-formed fuel cells having wall(s) including puncture-resistant materials could be included in new and/or legacy aircraft.

Consider various embodiments relating to a puncture-resistant liner that may be used to provide puncture resistance for fuel cell(s) of an aircraft fuel system. In some embodiments, a puncture-resistant liner may be placed within a fuel cell compartment and fuel cells may be placed on top of the puncture-resistant liner. The puncture-resistant liner may protect the outer walls including, but not limited to, bottom and side outer walls of the fuel cells from puncture type damage in some embodiments. In still some embodiments, a puncture-resistant liner may be attached to the outer surfaces of one or more outer wall(s) of a fuel cell to protect the wall(s) from puncture type damage. In still some embodiments, a puncture-resistant liner may be attached to the inner surfaces of one or more outer wall(s) of a fuel cell to protect the wall(s) from puncture type damage.

In some embodiments, a puncture-resistant liner may include fasteners (e.g., bolts, screws, spring-loaded fasteners, pressure fasteners, tacky surface fasteners, etc.) and/or other fastening means (e.g., washers, grommets, eyelets, openings, hooks, hook and loop features, etc.) for attaching the liner to fuel cell(s), within storage bay(s) and/or compartment(s), to an airframe component, combinations thereof, or the like. In various embodiments, the fasteners and/or fastening means may be integrated into the liner (e.g., pre-positioned in the liner during its manufacture) and/or not integrated into the liner (e.g., added during installation of the liner) and may be spaced throughout the liner, may be placed at the edges of the liner, may be located at unique locations, combinations thereof, or the like.

In various embodiments, a puncture-resistant liner that may be positioned proximate to one or more outer wall(s) of a fuel cell may be a woven material made from metallic materials (e.g., steel, aluminum, titanium, alloys, etc.), made from non-metallic materials (e.g., carbon fibers, carbon fiber reinforced polymers, etc.), and/or any combination thereof. For example, in some embodiments, the woven material made be made from metallic fibers that may be woven together to form a material often referred to as chainmail. Chainmail is inherently flexible and can be wrapped around and/or draped over, under, and/or around contours. Further chainmail can protect against high-pressure punctures that may come from all angles (e.g., any angles greater than 0 degrees and less than 180 degrees).

As referred to herein in this Specification, the term 'woven material' can include any material that is formed by any process including, but not limited to: interlacing first materials (e.g., metallic and/or non-metallic threads, fibers, etc.) that are along one direction with second materials (e.g., other metallic and/or nonmetallic threads, fibers, etc.) that are at another direction (e.g., at 90 degrees or less); interconnecting materials (e.g., metallic and/or non-metallic threads, fibers, links, loops, knots, etc.); and/or combinations thereof.

For embodiments in which a puncture-resistant liner includes conductive materials (e.g., metallic materials), electrical bonding may be provided between the liner and the airframe structure of an aircraft (e.g., using a conductive strap) to protect fuel cell(s) from electrically induced combustion (e.g., from a lightning strike, electrical short, electrostatic discharge, sparks, etc.).

In some embodiments, a puncture-resistant liner may optionally include a leak-resistant material, which may mitigate leaks that may occur during a potential impact upon a fuel cell. In at least one embodiment, the fuel-resistant material may be made of a fuel-resistant polymer (e.g., a polymer that may be impervious to fuel passing through the polymer). In various embodiments, a leak-resistant material may be applied along one or both surfaces of a puncture-resistant liner (e.g., painting, spraying, coating, or otherwise applying the material onto the surface(s) of the liner), may be impregnated within the liner and along its surfaces (e.g., dipping, injecting, or otherwise saturating the liner with the material), combinations thereof, and/or any other means for providing a leak-resistant material for a puncture-resistant liner. Different types of leak-resistant materials may be applied to a puncture-resistant liner in accordance with certain embodiments in order to mitigate against leaks of different types of materials (e.g., liquids, gasses, etc.) that may be stored in storage systems and/or devices following a catastrophic event (e.g., crash, collision, etc.)

Various features relating to a puncture-resistant liner discussed for various embodiments described herein could be incorporated into fuel cell designs in order to form a fuel cell having puncture-resistant materials included in one or more outer wall(s) of the fuel cell, which may protect the fuel cell from puncture type damage. Other materials of the fuel cell may provide for protection from blunt force damage. Thus, fuel cell wall(s) may be formed using two or more materials to provide protection from both blunt force type damage and puncture type damage.

Embodiments described throughout this disclosure may provide numerous technical advantages including, but not limited to, providing crash-resistant storage systems and/or devices that may include puncture-resistant liners and/or puncture-resistant outer walls that may protect such systems and/or devices from puncture type damage during a crash and/or collision; providing crash-resistant storage systems and/or devices that can be used in new and/or legacy aircraft; providing a flexible, puncture-resistant liner for storage cells (e.g., fuel cells); providing leak-resistant materials to puncture-resistant liners (e.g., by coating, impregnating, etc. a puncture-resistant liner with leak-resistant materials); forming outer wall(s) of a storage device to include puncture-resistant materials; providing fasteners and/or fastening means for puncture-resistant liners; and/or providing electrical bonding between a puncture-resistant liner that includes conductive material(s) and an airframe structure to electrostatically bond a fuel cell to an airframe structure.

Moreover, it should be appreciated that even though puncture-resistant storage systems and/or devices may be used for fuel systems/cells of aircraft, puncture-resistant storage systems and/or devices as discussed for various embodiments described herein may also be used in a variety of industries including, but not limited to, military, non-military, marine vehicles, aerospace vehicles, non-aircraft transportation vehicles (e.g., tanker trucks, boats, automobiles, motorcycles, busses, etc.), railway transportation, hazardous and/or corrosive chemical storage, pressure and/or non-pressure vessels, or the like, in accordance with embodiments of the present disclosure. Further puncture-resistant storage systems and/or devices as discussed for various embodiments described herein may be used for storing material in any physical state including, gasses, liquids, solids, and/or any combination thereof.

Example embodiments associated with providing a puncture-resistant storage system and/or puncture-resistant storage devices are described below with more particular reference to the remaining FIGURES. It should be appreciated that example rotorcraft 100 of FIGS. 1A-1B and the example tiltrotor aircraft 200 of FIG. 2 are merely illustrative of a variety of aircraft in which puncture-resistant storage systems and/or devices (e.g., crash-resistant fuel systems including puncture-resistant liners and/or having puncture-resistant walls) may be used in accordance with embodiments of the present disclosure. Other aircraft in which puncture-resistant storage systems and/or devices may be used can include, for example, fixed wing airplanes, hybrid aircraft, unmanned aircraft, gyrocopters, a variety of helicopter configurations, and drones, among other examples.

Referring to FIGS. 3A-3E, FIGS. 3A-3E illustrate example details that may be associated with puncture-resistant liners that may be used to provide puncture resistance and, in some embodiments, leak resistance for a storage system and/or storage device(s), in accordance with certain embodiments.

Figure 3A:
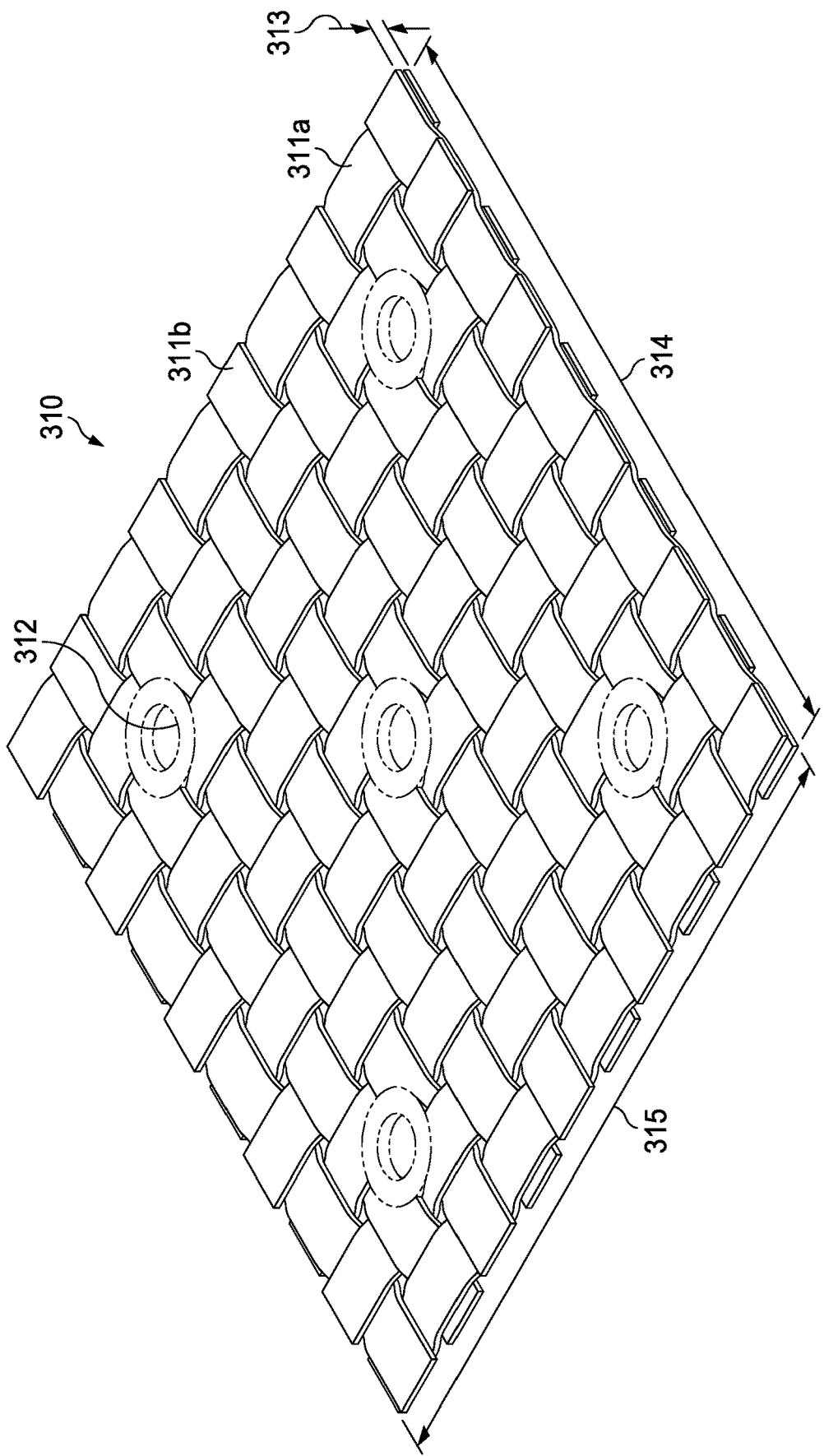
FIGS. 3A-3E are simplified diagrams illustrating example details associated with various puncture-resistant liners that may be used to provide puncture resistance for a storage system and/or storage device(s), in accordance with certain embodiments.

Referring to FIG. 3A, FIG. 3A is a simplified isometric view diagram illustrating example details that may be associated with a puncture-resistant liner 310 that may be used to provide puncture resistance for a storage system and/or storage device(s), in accordance with certain embodiments. Puncture-resistant liner 310 may include woven materials in which first woven materials 311a are interlaced in any suitable manner with second woven materials 311b to provide puncture resistance (e.g., resistance from sharp, pointed, serrated, etc. objects) for a storage system (e.g., an aircraft fuel system, etc.) and/or storage device(s).

In various embodiments, the first woven materials 311a and second woven materials 311b may be made from metallic materials, non-metallic materials, and/or any combination thereof that may provide puncture resistance features for the puncture-resistant liner 310. In some embodiments, first woven materials 311a may be made from the same or different materials than the second woven materials 311b. Puncture-resistant liner 310 may be flexible to provide for the ability to be draped and/or otherwise placed within a storage device compartment (e.g., a fuel cell compartment), to be wrapped around a storage device (e.g., around outer wall(s) of a fuel cell), to be lined within a storage device, combinations thereof, and/or the like, in accordance with various embodiments.

In some embodiments, puncture-resistant liner 310 may include one or more fasteners and/or fastening mean(s) 312. Fastener(s) and/or fastening mean(s) can be referred to herein using the term fastener(s)/fastening mean(s). Fastener(s)/fastening mean(s) 312 illustrated in the embodiment of FIG. 3A may be washers that may be pre-positioned or otherwise integrated into (e.g., welded, bonded, woven into, etc.) puncture-resistant liner 310. In some embodiments, however, fastener(s)/fastening mean(s) may not be integrated into a puncture-resistant liner (e.g., liner 310) but may instead be added during installation of the liner. In still some embodiments, a combination of pre-positioned and later added fastener(s)/fastening mean(s) may be used to install puncture-resistant liner 310 within a storage system and/or around storage device(s). Fastener(s)/fastening mean(s) 312 provided for the puncture-resistant liner 310 may have any suitable spacing, dimensions (e.g., thickness, width, diameter, etc.) to provide for securing the puncture-resistant liner 310 within a storage device compartment (e.g., on the floor, walls, etc. of a fuel cell compartment), around and/or onto a storage device (e.g., around and/or onto wall(s) of a fuel cell), within a storage device, combinations thereof, or the like, in accordance with various embodiments described herein.

Puncture-resistant liner 310 (and any other puncture-resistant liners described herein) may be formed with any suitable dimensions (e.g., overall length, overall width, material (e.g., materials 311a, 311b) width, material thickness, overall thickness, etc.). For example, in various embodiments, puncture-resistant liner 310 (and any other puncture-resistant liners described herein) may have an overall thickness 313 (e.g., including leak resistant material(s), if used) ranging between 0.020 inches and 3.0 inches; however, other thicknesses can be envisioned depending on implementations and/or applications. In various embodiments, puncture-resistant liner 310 (and any other puncture-resistant liners described herein) may have an overall length 314 and an overall width 315, each of which may range between several inches and several feet; however, other widths and lengths can be envisioned depending on implementations and/or applications.

Some of the elements, features, etc. illustrated and/or encompassed by puncture-resistant liner 310 illustrated in the embodiment of FIG. 3A (e.g., dimensions, puncture resistance features, flexibility features, fastener(s)/fastening mean(s), etc.) may be included in and/or encompassed by other puncture-resistant liners discussed for FIGS. 3B-3E; however, the discussion of some of these elements is not repeated when discussing these FIGURES and any of these elements may take any of the forms disclosed herein.

Figure 3B:
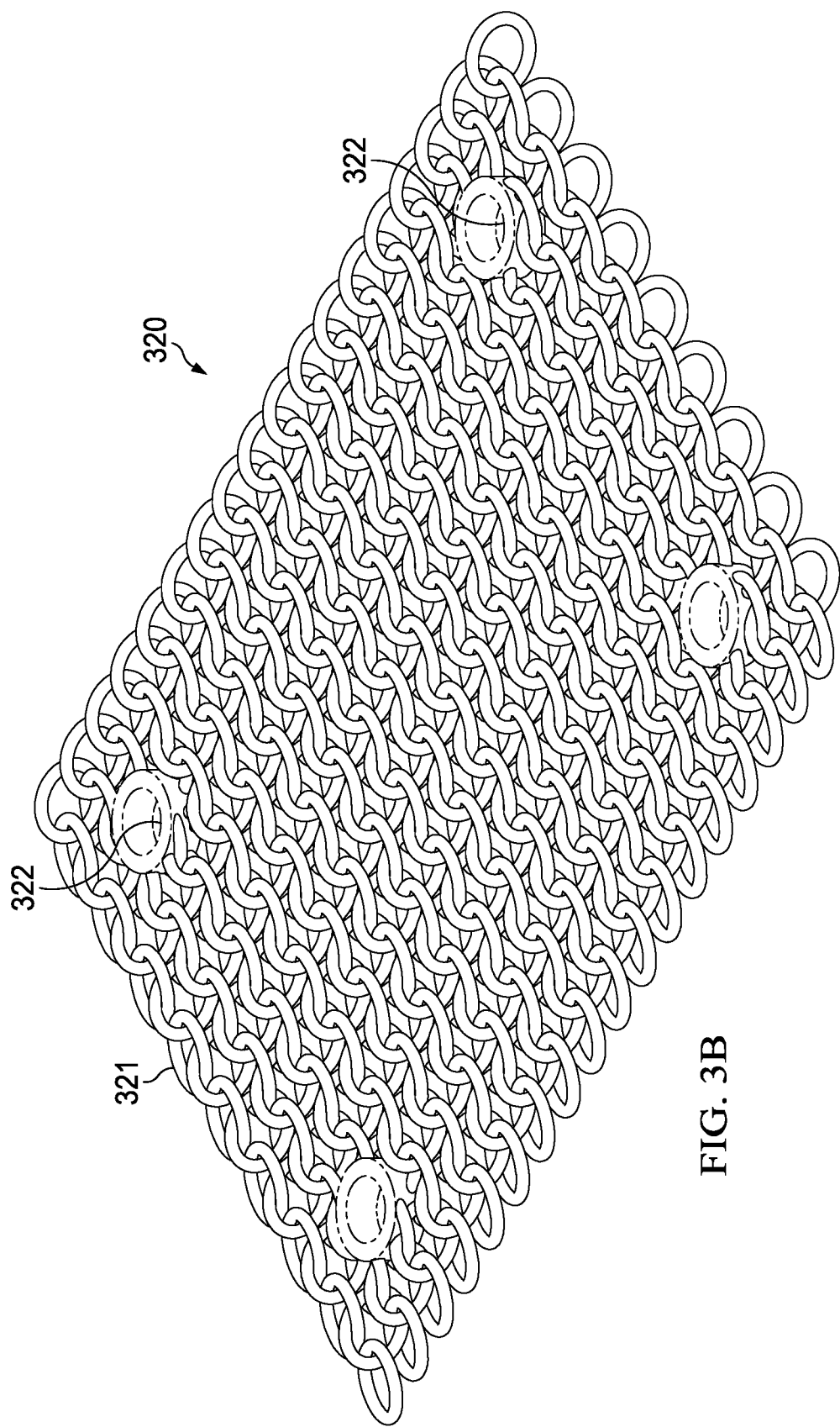

Referring to FIG. 3B, FIG. 3B is a simplified isometric view diagram illustrating example details that may be associated with another puncture-resistant liner 320 that may be used to provide puncture resistance for a storage system and/or storage device(s), in accordance with certain embodiments. Puncture-resistant liner 320 may include woven materials in which links 321 are coupled together in any suitable manner to provide puncture resistance (e.g., resistance from sharp, pointed, serrated, etc. objects) for a storage system (e.g., an aircraft fuel system, etc.). In various embodiments, the links 321 may be made from metallic materials, non-metallic materials, and/or any combination thereof that may provide puncture resistance features for the puncture-resistant liner 320. In some embodiment, links 321 may be coupled together by welding the links 321 together; however, other methods may be used to couple links 321 together in accordance with embodiments described herein.

Puncture-resistant liner 320 may be flexible to provide for the ability to be draped or otherwise placed within a storage device compartment (e.g., a fuel cell compartment), to be wrapped around a storage device (e.g., around wall(s) of a fuel cell), to be lined within a storage device, combinations thereof, and/or the like, in accordance with various embodiments. In some embodiments, puncture-resistant liner 320 may include one or more fastener(s)/fastening mean(s) 322 pre-positioned or otherwise integrated into puncture-resistant liner 320. In some embodiments, some fastener(s)/fastening mean(s) 322 may be added during installation of the liner 320. In still some embodiments, a combination of pre-positioned and later added fastener(s)/fastening mean(s) may be used to install puncture-resistant liner 320 within a storage system and/or around/within storage device(s).

Figure 3C:
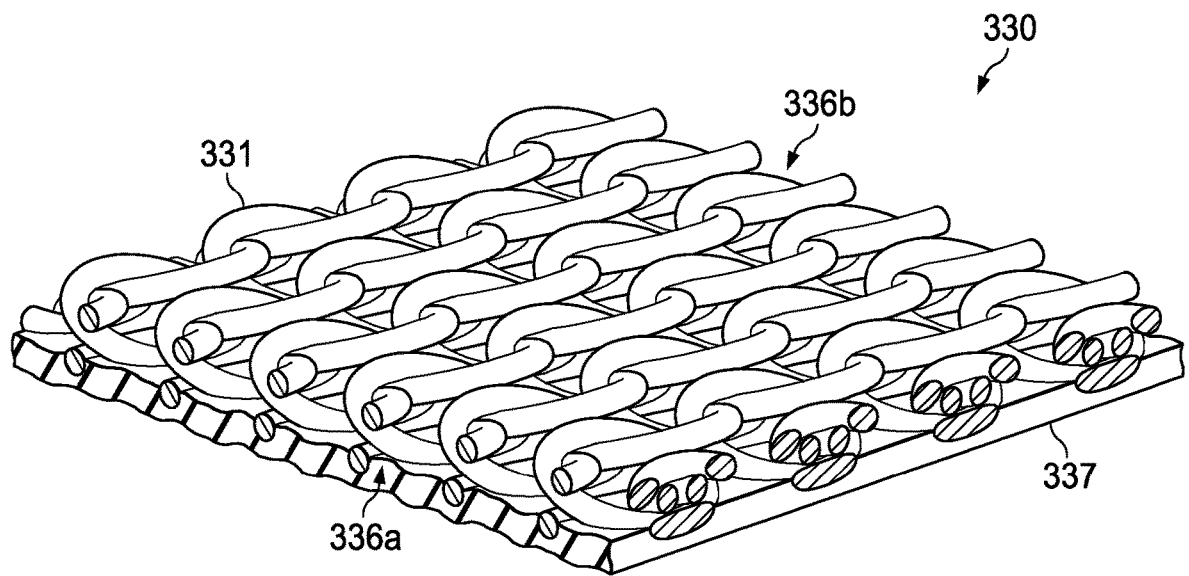

Referring to FIG. 3C, FIG. 3C is a simplified isometric view diagram illustrating example details that may be associated with another puncture-resistant liner 330 that may be used to provide puncture resistance and leak resistance for a storage system and/or storage device(s). Puncture-resistant liner 330 may include woven materials in which links 331 are coupled together in any suitable manner to provide puncture resistance (e.g., resistance from sharp, pointed, serrated, etc. objects) for a storage system (e.g., an aircraft fuel system, etc.). In various embodiments, the links 331 may be made from metallic materials, non-metallic materials, and/or any combination thereof that may provide puncture resistance features for the puncture-resistant liner 330.

A first surface 336a and a second surface 336b are illustrated for the puncture-resistant liner 330. As referred to herein in this Specification, a 'surface' of a puncture-resistant liner (e.g., first surface 336a of puncture-resistant liner 330) may include the surface of the woven materials (e.g., threads, fibers, links, etc.) included on one side of the puncture-resistant liner. For example, links 331 on one side of puncture-resistant liner 330 may form a first surface (e.g., first surface 336a) for the liner and links 331 on an opposing side of puncture-resistant liner 330 may form a second surface (e.g., second surface 336b) for the liner. In another example, a first side of materials 311a, 311b as shown in the embodiment of FIG. 3A may form a first surface for puncture-resistant liner 310 and a second side of materials 311a, 311b (and/or other woven materials, if included) may form a second surface for puncture-resistant liner 310.

Returning to FIG. 3C, puncture-resistant liner 330 may include a leak-resistant material 337 covering the first surface 336a of the puncture-resistant liner 330. The leak-resistant material 337 may help puncture-resistant liner 330 to protect against leaks that may occur as a result of damage to a storage device (e.g., a fuel cell). For example, consider a crash or collision in which a pointed object impacts a fuel storage device. The puncture-resistant liner 330 can protect the fuel storage device from being punctured by the pointed object; however, the fuel storage device may still experience deformation as a result of the pointed object impact. In some cases, such deformation can cause a storage device to rip or tear; thereby resulting in potential leaks from the storage device. Accordingly, leak-resistant material 337 may help puncture-resistant liner 330 to protect against potential leaks from a storage device that may occur during a catastrophic event. Leak-resistant material 337 may partially and/or fully cover links 331 along the first surface 336a of the puncture-resistant liner 330. The leak-resistant material 337 thickness may vary depending on the thickness of the puncture-resistant liner material(s), implementations, applications, combinations thereof, or the like.

In some embodiments, leak-resistant material 337 may be made of a polymer. For example, in at least one embodiment, leak-resistant material 337 may be made of a fuel-resistant polymer that may be impervious to fuel passing through the material 337. Although not illustrated in the embodiment of FIG. 3C, it is to be understood that any fastener(s)/fastening mean(s) may be included in a puncture-resistant liner that includes leak resistant materials along one or both surface(s).

Figure 3D:
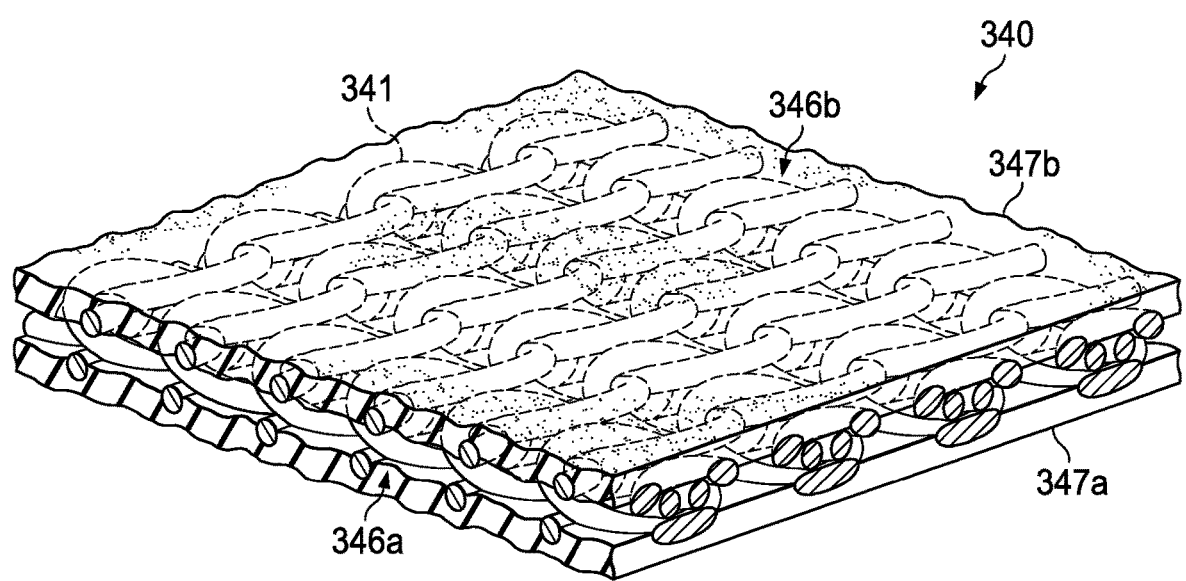

Referring to FIG. 3D, FIG. 3D is a simplified isometric view diagram illustrating example details that may be associated with another puncture-resistant liner 340 that may be used to provide puncture resistance and leak resistance for a storage system and/or storage device(s). Puncture-resistant liner 340 may include woven materials in which links 341 are coupled together in any suitable manner to provide puncture resistance (e.g., resistance from sharp, pointed, serrated, etc. objects) for a storage system (e.g., an aircraft fuel system, etc.). In various embodiments, the links 341 may be made from metallic materials, non-metallic materials, and/or any combination thereof that may provide puncture resistance features for the puncture-resistant liner 340.

The puncture-resistant liner 340 includes a first surface 346a and a second surface 346b. Puncture-resistant liner 340 may include a first leak-resistant material 347a covering the first surface 346a of the puncture-resistant liner 340 and a second leak-resistant material 347b covering the second surface 346b of the puncture-resistant liner 340. The leak-resistant materials 347a, 347b may help puncture-resistant liner 340 to protect against leaks that may occur as a result of damage to a storage device (e.g., a fuel cell). Leak-resistant materials 347a, 347b may partially and/or fully cover links 341 along the first surface 346a and the second surface 346b of the puncture-resistant liner 340.

Figure 3E:
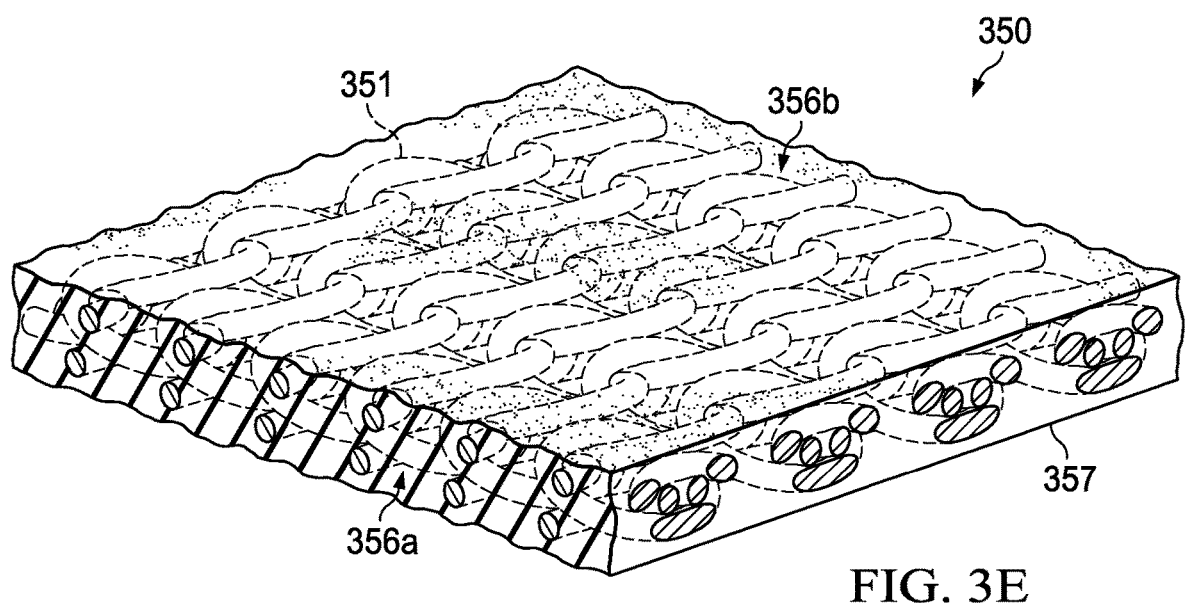

Referring to FIG. 3E, FIG. 3E is a simplified isometric view diagram illustrating example details that may be associated with another puncture-resistant liner 350 that may be used to provide puncture resistance and leak resistance for a storage system and/or storage device(s). Puncture-resistant liner 350 may include woven materials in which links 351 are coupled together in any suitable manner to provide puncture resistance (e.g., resistance from sharp, pointed, serrated, etc. objects) for a storage system (e.g., an aircraft fuel system, etc.). In various embodiments, the links 351 may be made from metallic materials, non-metallic materials, and/or any combination thereof that may provide puncture resistance features for the puncture-resistant liner 350.

The puncture-resistant liner includes a first surface 356a and a second surface 356b. Puncture-resistant liner 350 may be impregnated with a leak resistant material 357 that may cover both the first and second surfaces 356a, 356b, respectively, and saturate areas between the woven materials (e.g., links 351) between the first and second surfaces 356a, 356b. In various embodiments, a puncture-resistant liner that is impregnated with a leak-resistant material (e.g., puncture-resistant liner 350 impregnated with leak-resistant material 357) may have a thickness that may vary depending on the thickness of the puncture-resistant liner material(s), implementations, applications, combinations thereof, or the like. Although not illustrated in the embodiment of FIG. 3E, it is to be understood that any fastener(s)/fastening mean(s) may be included in a puncture-resistant liner that is impregnated with leak resistant materials.

Figure 4:
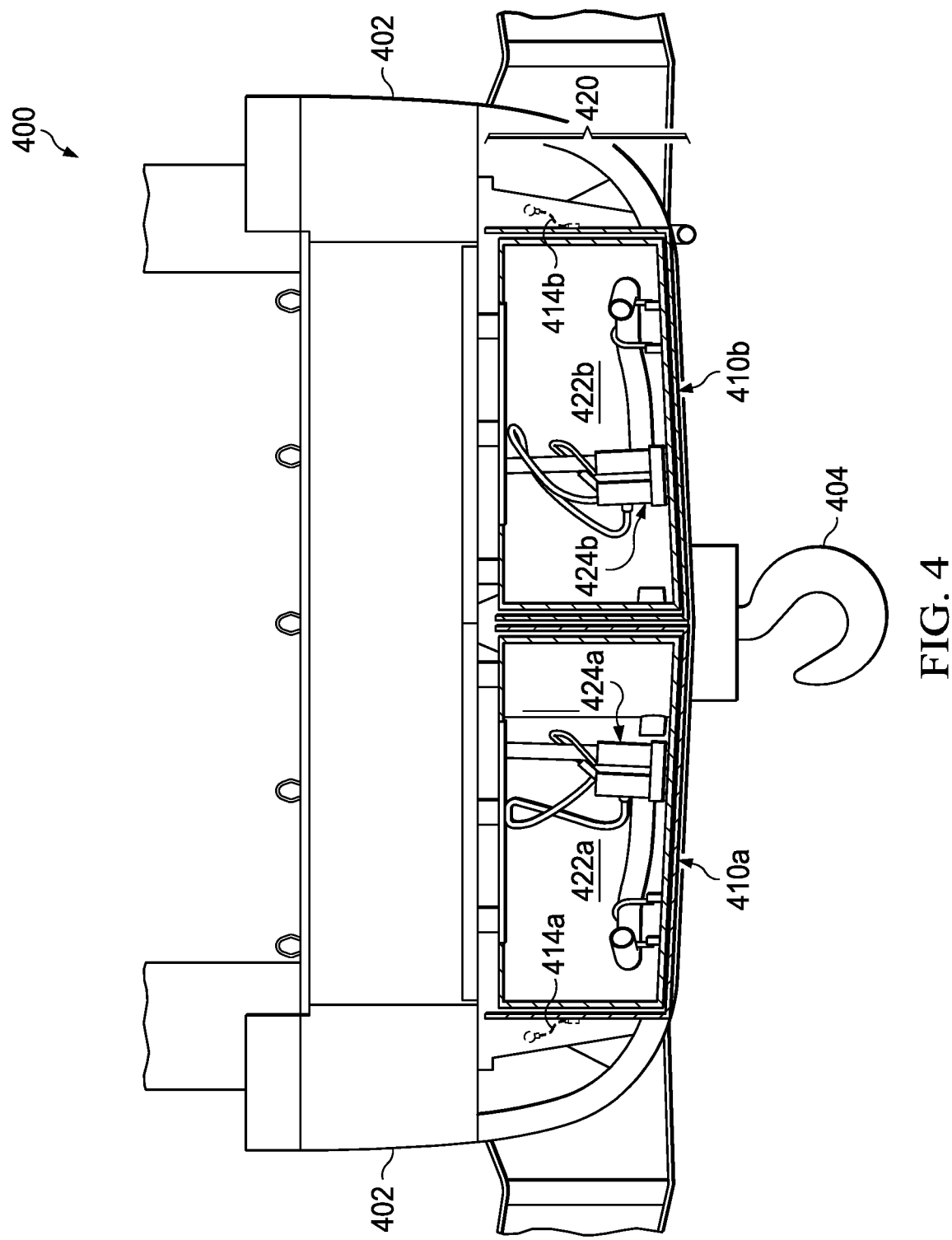
FIG. 4 is a simplified side view diagram illustrating example details associated with a puncture-resistant liner that may be used to provide puncture resistance for a fuel storage system of an aircraft, in accordance with certain embodiments.

Referring to FIG. 4, FIG. 4 is simplified side-view diagram illustrating example details in which puncture-resistant liners 410a, 410b may be used to provide puncture resistance for a storage system 420 of an aircraft 400, in accordance with certain embodiments. For example, storage system 420 may be a fuel storage system (or, more generally, a fuel system) for aircraft 400. Only a portion of aircraft 400 is illustrated in the embodiment of FIG. 4. Aircraft 400 may include an airframe structure 402, which may provide structural support, etc. for the aircraft 400. Aircraft 400 may further include a cargo hook 404.

Storage system 420 may include a first storage device 422a (e.g., a first fuel cell) and a second storage device 422b (e.g., a second fuel cell) contained within a storage system compartment (not labeled) for the aircraft. The first storage device 422a can include components 424a (e.g., pumps, hoses, etc.) for pumping fluid (e.g., fuel) from the first storage device 422a and the second storage device can include components 424b for pumping fluid from the second storage device 422b. A first puncture-resistant liner 410a may be provided between bottom and side outer walls of the first storage device 422a and the storage system compartment and a second puncture-resistant liner 410b may be provided between bottom and side outer walls of the second storage device 422b and the storage system compartment. In at least one embodiment, providing the first puncture-resistant liner 410a and the second puncture-resistant liner 422b within the storage system 420 may enable CRFS certification of the aircraft 400 for protection from puncture type damage (e.g., in addition to blunt force type damage).

In some embodiments, the first puncture-resistant liner 410a and first storage device 422a may be electrically bonded to the airframe structure 402 using a first conductive strap 414a that is electrically and mechanically coupled to the first puncture-resistant liner 410a and the airframe structure 402 and the second puncture-resistant liner 410b and second storage device 422b may be electrically bonded to the airframe structure 402 using a second conductive strap 414b that is electrically and mechanically coupled to the second puncture-resistant liner 410b and the airframe structure 402. In some embodiments, the first and second puncture-resistant liners 410a, 410b may be electrically and mechanically coupled together such that only one of the liners 410a, 410b may be electrically and mechanically coupled to the airframe in order to electrically bond the storage devices 422a, 422b to the airframe structure 402. In still some embodiments, a single puncture resistant liner (e.g., as shown in FIGS. 5A-5B) may be positioned in a storage system compartment and may be electrically bonded to an airframe structure of an aircraft.

In various embodiments, one or both of first puncture-resistant liner 410a and/or second puncture resistant liner 410b may include fastener(s)/fastening mean(s) (not shown). In various embodiments, one or both of first puncture-resistant liner 410a and/or second puncture-resistant liner 410b may include leak-resistant material(s) (e.g., on one or both surface(s) of the liners or impregnated throughout the liners) to provide leak resistance for the storage device(s) 422a, 422b.

Figure 5A:
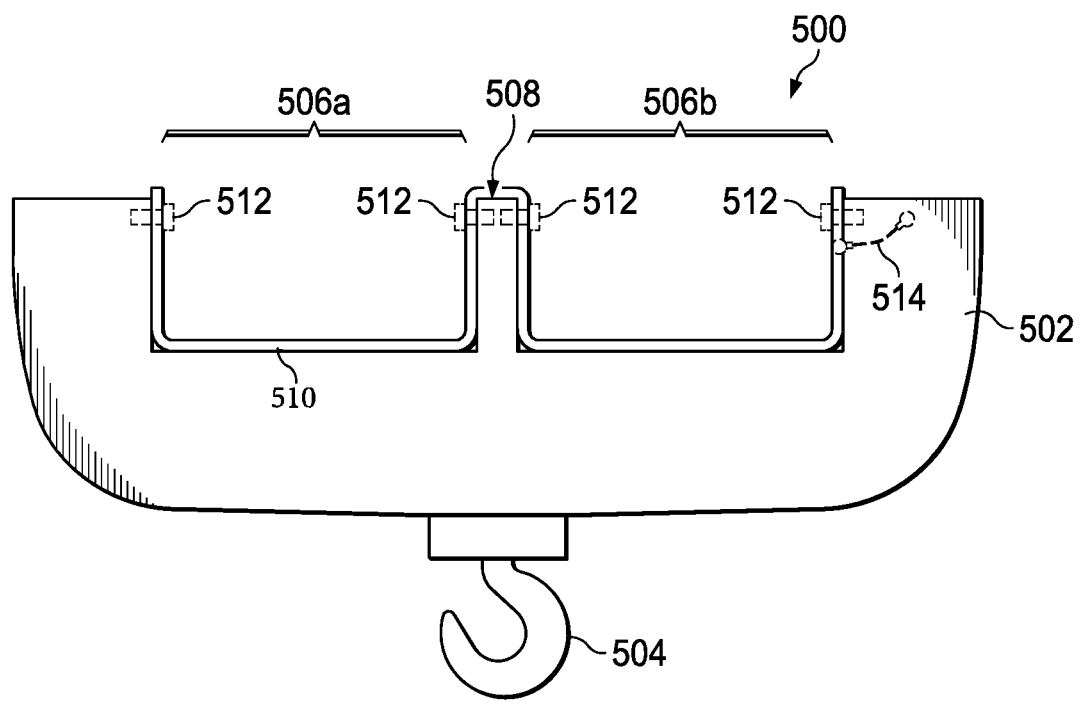
FIGS. 5A-5B are simplified side view diagrams illustrating example details associated with providing a puncture-resistant liner for a fuel storage system of an aircraft, in accordance with certain embodiments.
Figure 5B:
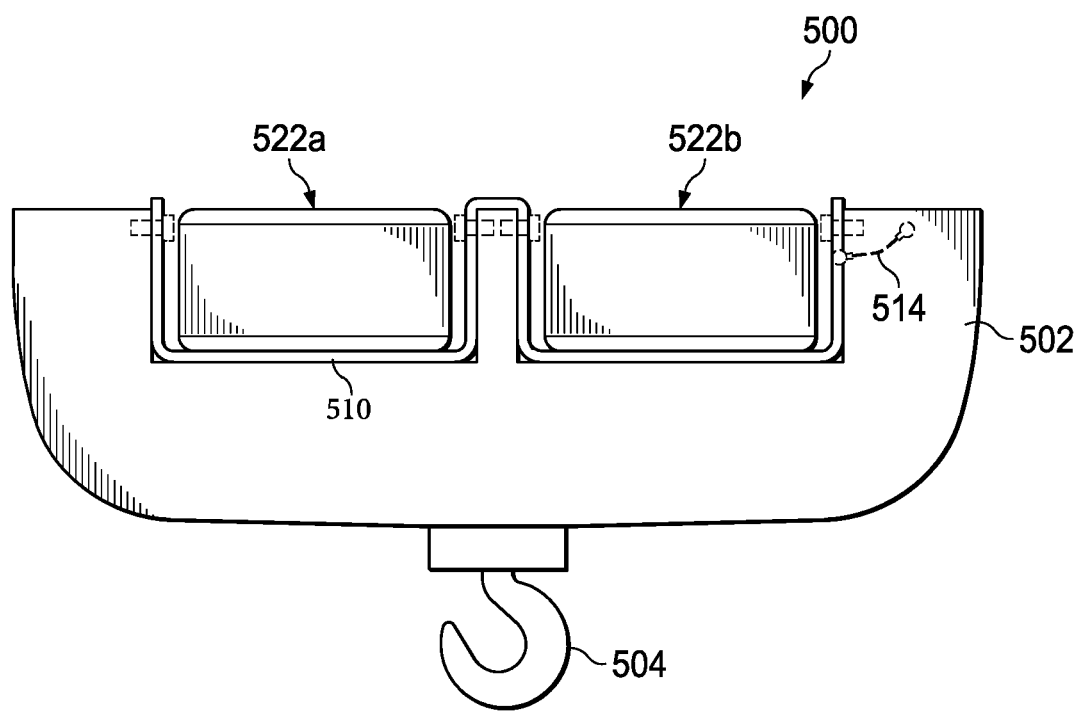

Referring to FIGS. 5A-5B, FIGS. 5A-5B are simplified side-view diagrams illustrating example details associated with providing a puncture-resistant liner 510 for a fuel system 520 of an aircraft 500, in accordance with certain embodiments. Only a portion of aircraft 500 is illustrated in the embodiment of FIGS. 5A-5B. Aircraft 500 can include an airframe structure 502, which may provide structural support, etc. for the aircraft 500. Aircraft 500 may further include a cargo hook 504 attached to the airframe structure 502. The airframe structure 502 may provide fuel cell compartments 506, including a first fuel cell compartment 506a in which a first fuel cell 522a (FIG. 5B) may be installed and a second fuel cell compartment 506b in which a second fuel cell 522b (FIG. 5B) may be installed. In at least one embodiment prior to installing the first and second fuel cells 522a, 522b, puncture-resistant liner 510 may be installed in the first and second fuel cell compartments 506a, 506b. For example, the puncture-resistant liner 510 may be laid into the first and second fuel cell compartments 506a, 506b by a person. In at least one embodiment, the puncture-resistant liner 510 may be draped over a dividing wall 508 that may separate the first and second fuel compartments 506a, 506b. Flexibility of the puncture-resistant liner 510 may allow it to drape and/or otherwise contour over angles, crevices, bends, turns, etc. of the first and second fuel cell compartments 506a, 506b.

In some embodiments, the puncture-resistant liner 510 may be secured within the first and second fuel cell compartments 506a, 506b using fastener(s)/fastening mean(s) 512. As illustrating in the embodiment of FIG. 5A, fastener(s)/fastening mean(s) 512 may be used to secure the puncture-resistant liner 510 within the first and second fuel cell compartments 506a, 506b at side walls (not labeled) and/or dividing wall 508 within the first and second fuel cell compartments 506a, 506b. In some embodiments, securing the puncture-resistant liner 510 within the first and/or second fuel cell compartments 506a, 506b may provide for electrically bonding the puncture resistant liner 510 and the first and second fuel cells 522a, 522b to the airframe structure 502. In still some embodiments, the puncture-resistant liner 510 may be electrically bonded to the airframe structure 502 by providing a conductive strap 514 that may be electrically and mechanically coupled to the puncture-resistant liner 510 and the airframe structure 502.

Following installation of the puncture-resistant liner 510, the first fuel cell 522a may be installed in the first fuel cell compartment 506a and the second fuel cell 522b may be installed in the second fuel cell compartment 506b. Following installation of the first and second fuel cells 522a, 522b the side outer walls and bottom outer walls of each fuel cell 522a, 522b may be protected from puncture type damage that may impact the fuel cells (e.g., from cargo hook 504) during a crash, collision, etc. In at least one embodiment, puncture-resistant liner 510 may include leak-resistant material(s) (e.g., on one or both surface(s) of the liner or impregnated throughout the liner) to provide additional leak resistance for the fuel cell(s) 522a, 522b in case of a crash, collision, etc.

Figure 6:
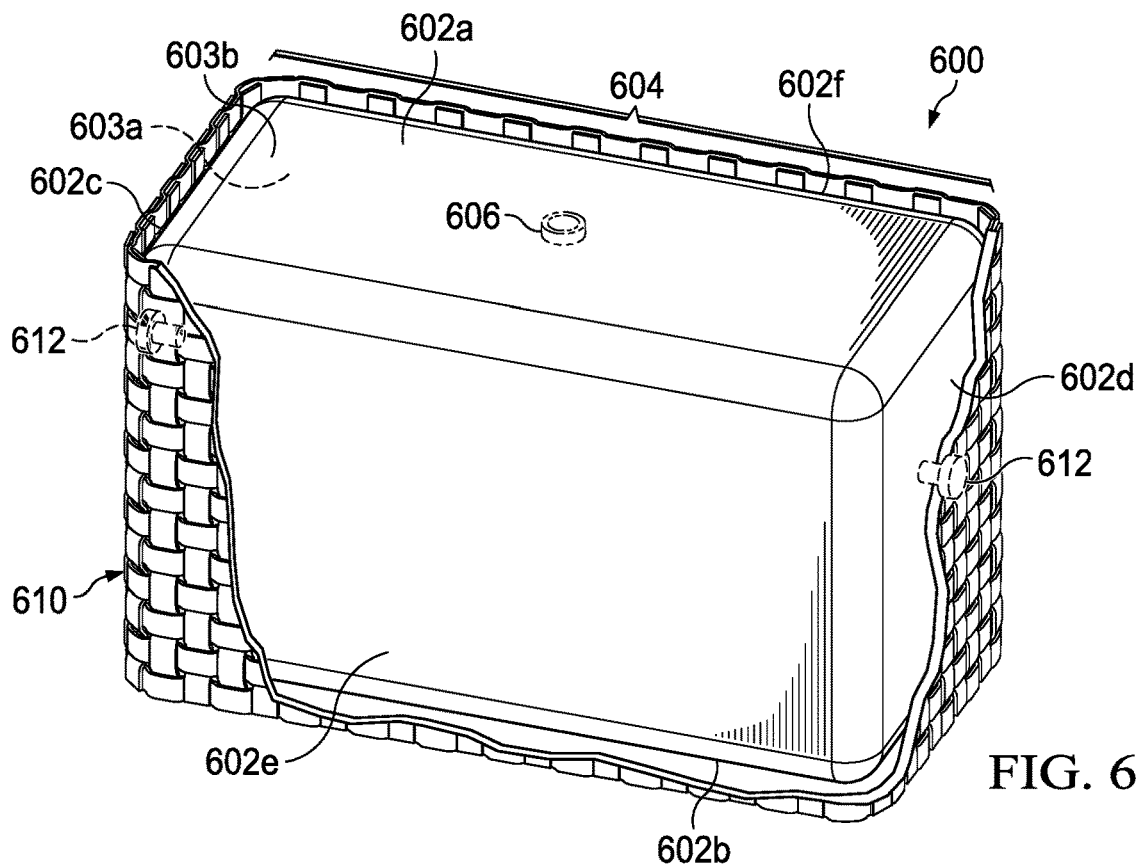
FIG. 6 is a simplified isometric view diagram illustrating example details associated with providing a puncture-resistant liner along exterior surface(s) of a storage device, in accordance certain embodiments.

Referring to FIG. 6, FIG. 6 is a simplified isometric view diagram illustrating example details associated with providing a puncture-resistant liner 610 along exterior surface(s) of a storage device 600, in accordance with certain embodiments. Storage device 600 can include a number of outer walls 602 (labeled 602a-602f) that may be coupled together to form an enclosed (e.g., sealed) volume 604. Each of the outer walls 602 may have an inner surface 603a and an outer surface 603b. The outer walls 602 can include but not be limited to: a top outer wall 602a, a bottom outer wall 602b, and side outer walls 602c-602f.

In at least one embodiment, storage device 600 may further include one or more port(s) 606 through which fluids, gasses, etc. may flow, be pumped through, etc. For example, in at least one embodiment a port 606 may be positioned along the top outer wall 602a of the storage device 600; although it is to be understood that port(s) may be included through any outer walls of a storage device. Further, it is to be understood that in some embodiments, no ports may be provided for a storage device. For example, in some embodiments, hoses, tubes, etc. may be integrated into a storage device to allow the passage of fluids, gasses, etc. into and/or out of a storage device. In general, storage device 600 may represent any storage tank, container, vessel, bladder, etc. that may be used to store, hold, etc. fluids, gasses, etc. and may be formed of any suitable materials and/or having any suitable size (e.g., less than one gallon to thousands of gallons) depending on applications and/or implementations.

Although outer walls 602 are illustrated has having substantially horizontal and vertical features, it is to be understood that outer walls 602 of storage device 600 may have any shape, may be rigid, semi-rigid, flexible, and/or may have any other properties (e.g., thickness, etc.) depending on applications and/or implementations. The storage device 600 can include any other suitable exterior and/or interior features, systems, etc. (e.g., pumps, sensors, electrical elements, etc.) depending on applications and/or implementations.

In at least one embodiment, puncture-resistant liner 610 may be positioned proximate to (e.g., near, on, attached to, covering, etc.) the outer surfaces 603b of one or more outer wall(s) 602 of the storage device 600. For example, in some embodiments, the puncture-resistant liner 610 may be positioned proximate to only the outer surface 603b of the bottom outer wall 602b. In still some embodiments, the puncture-resistant liner 610 may be positioned proximate to the outer surfaces 603b of the bottom outer wall 602b and side outer walls 602c-602f, as shown in the embodiment of FIG. 6. These configurations are only a few of the many potential configurations of a puncture-resistant liner that may be provided proximate to outer surfaces of one or more outer wall(s) of a storage device. Virtually any other puncture-resistant liner configurations may be envisioned and, thus, are clearly within the scope of the present disclosure.

In some embodiments, one or more fastener(s)/fastening mean(s) 612 may be provided for the puncture-resistant liner 610 in order to secure the liner to outer surfaces 603b of one or more outer wall(s) 602 of the storage device 600. In at least one embodiment, puncture-resistant liner 610 may include leak-resistant material(s) (e.g., on one or both surface(s) of the liner or impregnated throughout the liner) to provide additional leak resistance for the storage device 600 in case damage ruptures one or more outer wall(s) 602 of the storage device 600. In still some embodiments, conductive strap(s) (not shown) may be electrically and mechanically coupled to the puncture-resistant liner 610 in order to provide electrical bonding for the liner.

Figure 7:
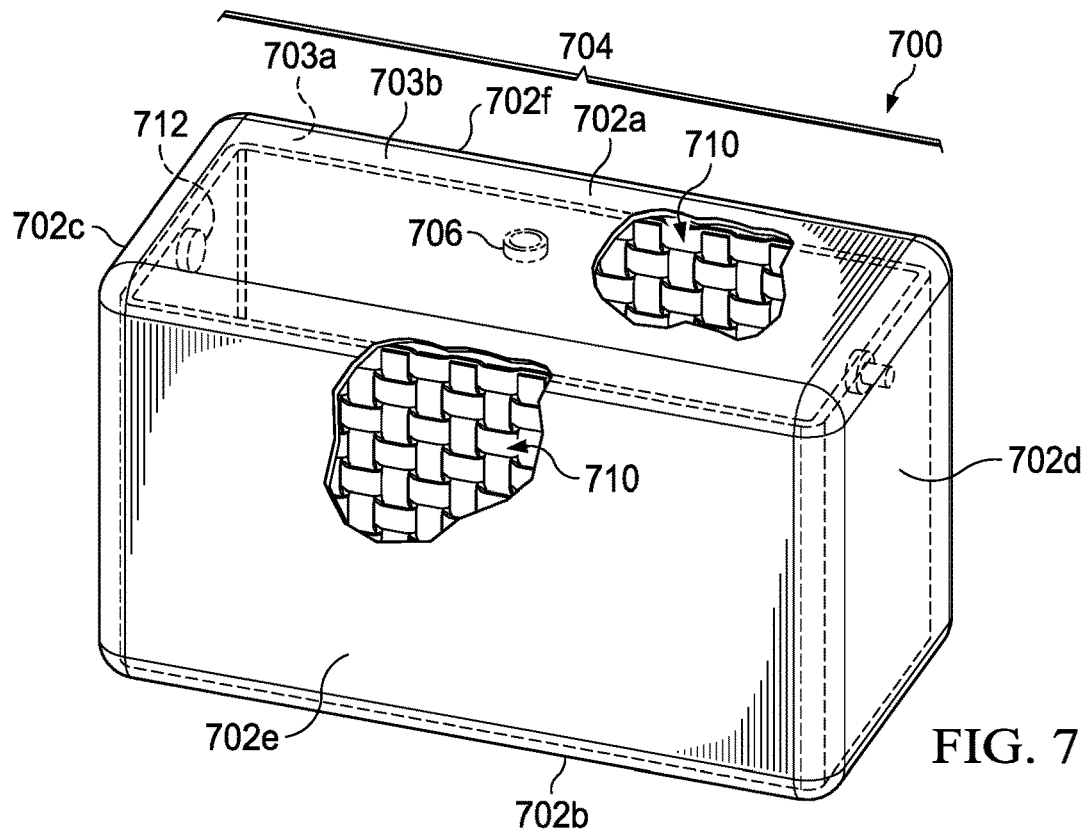
FIG. 7 is a simplified isometric view diagram illustrating example details associated with providing a puncture-resistant liner along interior surface(s) of a storage device, in accordance with certain embodiments.

Referring to FIG. 7, FIG. 7 is a simplified isometric view diagram illustrating example details associated with providing a puncture-resistant liner 710 along interior surface(s) of a storage device 700, in accordance with certain embodiments. Storage device 700 can include a number of outer walls 702 (labeled 702a-702f) that may be coupled together to form an enclosed (e.g., sealed) volume 704. Each of the outer walls 702 may have an inner surface 703a and an outer surface 703b. The outer walls 702 can include but not be limited to: a top outer wall 702a, a bottom outer wall 702b, and side outer walls 702c-702f.

In at least one embodiment, storage device 700 may further include one or more port(s) 706 through which fluids, gasses, etc. may flow, be pumped through, etc. For example, in at least one embodiment a port 706 may be positioned along the top outer wall 702a of the storage device 700; although it is to be understood that port(s) may be included through any outer walls of a storage device. Further, it is to be understood that in some embodiments, no ports may be provided for a storage device. For example, in some embodiments, hoses, tubes, etc. may be integrated into a storage device to allow the passage of fluids, gasses, etc. into and/or out of a storage device. In general, storage device 700 may represent any storage tank, container, vessel, bladder, etc. that may be used to store, hold, etc. fluids, gasses, etc. and may be formed of any suitable materials and/or having any suitable size (e.g., less than one gallon to thousands of gallons) depending on applications and/or implementations.

Although outer walls 702 are illustrated has having substantially horizontal and vertical features, it is to be understood that outer walls 702 of storage device 700 may have any shape, may be rigid, semi-rigid, flexible, and/or may have any other properties (e.g., thickness, etc.) depending on applications and/or implementations. The storage device 700 can include any other suitable exterior and/or interior features, systems, etc. (e.g., pumps, sensors, electrical elements, etc.) depending on applications and/or implementations.

In at least one embodiment, puncture-resistant liner 710 may be positioned proximate to (e.g., near, on, attached to, covering, etc.) the inner surfaces 703a of one or more outer wall(s) 702 of the storage device 700. For example, in some embodiments, the puncture-resistant liner 710 may be positioned proximate to only the inner surface 703a of the bottom outer wall 702b. In still some embodiments, the puncture-resistant liner 710 may be positioned proximate to the inner surfaces 703a of the bottom outer wall 702b and side outer walls 702c-702f, as shown in the embodiment of FIG. 7. These configurations are only a few of the many potential configurations of a puncture-resistant liner that may be provided proximate to inner surfaces of one or more outer wall(s) of a storage device. Virtually any other puncture-resistant liner configurations may be envisioned and, thus, are clearly within the scope of the present disclosure.

In some embodiments, one or more fastener(s)/fastening mean(s) 712 may be provided for the puncture-resistant liner 710 in order to secure the liner to inner surfaces 703a of one or more outer wall(s) 702 of the storage device 700. In at least one embodiment, fastening mean(s) 712 can include an adhesive or adhesive system that may be used to affix the puncture-resistant liner 710 on the inner surfaces 703 of one or more outer wall(s). In at least one embodiment, puncture-resistant liner 710 may include leak-resistant material(s) (e.g., on one or both surface(s) of the liner or impregnated throughout the liner) to provide additional leak resistance for the storage device 700 in case damage ruptures one or more outer wall(s) 702 of the storage device 700. In still some embodiments, conductive strap(s) (not shown) may be electrically and mechanically coupled to the puncture-resistant liner 710 in order to provide electrical bonding for the liner.

Referring to FIG. 8A, FIG. 8A is a simplified isometric view diagram illustrating example details associated with an example storage device 800 that may be formed to include puncture-resistant materials 810 (e.g., puncture-resistant woven materials such as interlaced and/or linked materials described herein) within one or more outer wall(s) 802 of the storage device 800, in accordance with certain embodiments. Referring to FIG. 8B, FIG. 8B is a simplified side, cross-sectional view of a portion of an outer wall 802d of the example storage device 800 of FIG. 8A, in accordance with certain embodiments. The cross-section of FIG. 8B is cut along a line as generally indicated by the lines labeled '8B' in FIG. 8A.

Storage device 800 can include a number of outer walls 802 (labeled 802a-802f) that may be coupled together to form an enclosed (e.g., sealed) volume 804. Each of the outer walls 802 may have an inner surface 803a and an outer surface 803b. The outer walls 802 can include but not be limited to: a top outer wall 802a, a bottom outer wall 802b, and side outer walls 802c-802f.

In at least one embodiment, storage device 800 may further include one or more port(s) 806 through which fluids, gasses, etc. may flow, be pumped through, etc. For example, in at least one embodiment a port 806 may be positioned along the top outer wall 802a of the storage device 800; although it is to be understood that port(s) may be included through any outer walls of a storage device. Further, it is to be understood that in some embodiments, no ports may be provided for a storage device. For example, in some embodiments, hoses, tubes, etc. may be integrated into a storage device to allow the passage of fluids, gasses, etc. into and/or out of a storage device. In general, storage device 800 may represent any storage tank, container, vessel, bladder, etc. that may be used to store, hold, etc. fluids, gasses, etc. and may be formed of any suitable materials and/or having any suitable size (e.g., less than one gallon to thousands of gallons) depending on applications and/or implementations.

Although outer walls 802 are illustrated has having substantially horizontal and vertical features, it is to be understood that outer walls 802 of a storage device may have any shape, may be rigid, semi-rigid, flexible, and/or may have any other properties (e.g., thickness, etc.) depending on applications and/or implementations. The storage device 800 can include any other suitable exterior and/or interior features, systems, etc. (e.g., pumps, sensors, electrical elements, etc.) depending on applications and/or implementations.

One or more outer wall(s) 802 of storage device 800 may include puncture-resistant materials 810 that may be fabricated into and/or otherwise integrated into the outer wall(s) 802, which may provide puncture resistance for the storage device 800. A portion of side outer wall 802d is illustrated in FIG. 8B. As illustrated in FIG. 8B, puncture-resistant materials 810 may be formed within the side outer wall 802d, to provide puncture resistance for the storage device 800 along the side outer wall 802d. For the embodiment of FIGS. 8A-8B, all the outer walls 802 may include puncture-resistant materials formed therein; however, it is to be understood that any number of outer wall(s) 802 may include puncture-resistant material in accordance with embodiments described herein. For embodiments in which the materials for outer walls 802 (other than puncture-resistant material 810) are formed using flexible materials (e.g., polymers, etc.), leak resistance features may also be provided for storage device 800. For embodiments in which puncture-resistant material 810 is electrically conductive, one or more conductive strap(s) (not shown) may be integrated into and/or otherwise electrically and mechanically coupled to the storage device 800 in order to electrically bond the storage device 800 to a nearby conductive structure (e.g., a conductive airframe structure, etc.)

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A storage system comprising:
   a storage device, the storage device comprising a plurality of outer walls coupled together to form an enclosed volume;
   a storage device compartment for receiving the storage device; and
   a flexible liner configured to be draped within the storage device compartment so that the flexible liner is in direct contact with and attached to one or more of the outer walls of the storage device, wherein the flexible liner comprises a woven material that is puncture-resistant and impervious to fluids or gases passing through the material.

2. The storage system of claim 1, wherein the woven material comprises at least one of:
   a metallic material; and
   a non-metallic material.

3. The storage system of claim 1, wherein one of:
   the material covers at least one surface of the flexible liner; and
   the flexible liner is impregnated with the material.

4. The storage system of claim 3, wherein the material comprises a fuel resistant polymer.

5. The storage system of claim 1, wherein the flexible liner covers inner surfaces of one or more outer walls of the storage device compartment.

6. The storage system of claim 1, wherein the flexible liner covers outer surfaces of one or more outer walls of the storage device.

7. The storage system of claim 1, wherein the flexible liner is attached to one or more outer walls of the storage device using a plurality of fasteners.

8. The storage system of claim 7, wherein the plurality of fasteners are integrated into the flexible liner.

9. The storage system of claim 1, wherein the storage system is a fuel system of a rotorcraft, and the flexible liner is electrically bonded to a conductive frame of the rotorcraft.

10. The storage system of claim 9, wherein the storage device comprises first and second fuel cells received within the storage device compartment and wherein a dividing wall is provided between the first and second fuel cells within the storage device component, the flexible liner draped over the dividing wall and covering one or more outer walls of the first and second cells.

11. A vehicle comprising:
a fuel system, the fuel system comprising:
a fuel cell, the fuel cell comprising a plurality of outer walls coupled together to form an enclosed volume;
a fuel cell compartment for receiving the fuel cell; and
at least one of:
a flexible liner configured to be draped within the fuel cell compartment so that the flexible liner is in direct contact with and attached to one or more of the outer walls of the fuel cell, wherein the flexible liner comprises a woven material that is puncture-resistant and impervious to fluids or gases passing through the material; and
one or more of the outer walls of the fuel cell comprises a woven material that is puncture resistant.

12. The vehicle of claim 11, wherein the woven material comprises at least one of:
a metallic material; and
a non-metallic material.

13. The vehicle of claim 11, wherein the woven material comprises at least one of:
at least two materials interlaced together; and
a plurality of links coupled together.

14. The vehicle of claim 11, wherein one of:
the material covers at least one surface of the liner; and
the liner is impregnated with the material.

* * * * *